(12) United States Patent
Eaton et al.

(10) Patent No.: US 7,060,360 B2
(45) Date of Patent: Jun. 13, 2006

(54) BOND COAT FOR SILICON BASED SUBSTRATES

(75) Inventors: Harry E. Eaton, Woodstock, CT (US); Ellen Y. Sun, South Windsor, CT (US); Stephen Chin, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 362 days.

(21) Appl. No.: 10/443,342

(22) Filed: May 22, 2003

(65) Prior Publication Data

US 2004/0234784 A1 Nov. 25, 2004

(51) Int. Cl.
*B32B 9/00* (2006.01)
*F03B 3/12* (2006.01)

(52) U.S. Cl. .............. 428/446; 428/450; 428/697; 428/699; 428/701; 428/702; 416/241 B

(58) Field of Classification Search ............... 428/446, 428/697, 450, 698, 699, 700, 701, 702; 416/241 B, 416/241 R
See application file for complete search history.

(56) References Cited

U.S. PATENT DOCUMENTS

| | | | |
|---|---|---|---|
| 5,677,060 A | * 10/1997 | Terentieva et al. | .......... 428/408 |
| 6,254,935 B1 | 7/2001 | Eaton et al. | |
| 6,284,325 B1 | 9/2001 | Eaton, Jr. et al. | |
| 6,296,942 B1 | 10/2001 | Eaton, Jr. et al. | |
| 6,299,988 B1 | 10/2001 | Wang et al. | |
| 6,312,763 B1 | 11/2001 | Eaton, Jr. et al. | |
| 6,352,790 B1 | 3/2002 | Eaton et al. | |
| 6,365,288 B1 | 4/2002 | Eaton et al. | |
| 6,410,148 B1 | 6/2002 | Eaton, Jr. et al. | |
| 2002/0025454 A1 | 2/2002 | Wang et al. | |

* cited by examiner

*Primary Examiner*—Jennifer McNeil
(74) *Attorney, Agent, or Firm*—Bachman & LaPointe, P.C.

(57) ABSTRACT

A bond layer for use on a silicon based substrate. The bond layer comprises an alloy comprising a refractory metal disilicide/silicon eutectic. The refractory metal disilicide is selected from the group consisting of disilicides of molybdenum, chromium, hafnium, niobium, tantalum, rhenium, titanium, tungsten, uranium, vanadium, yttrium and mixtures thereof. The refractory metal disilicide/silicon eutectic has a melting point of greater than 1300° C.

14 Claims, 2 Drawing Sheets

BOND COAT FOR SILICON BASED SUBSTRATES

BACKGROUND OF THE INVENTION

The present invention is drawn to an environmental barrier coating and, more particularly, an environmental barrier coating applied to a silicon containing substrate.

Silicon based ceramics exhibit accelerated oxidation rates in high temperature, aqueous environments such as for example, the combustor and turbine sections of gas turbine engines. In order to reduce the rate of oxidation on silicon based substrates used as ceramic components in such environments, significant effort has been given to providing environment barrier coating, i.e., barrier layer(s), for the silicon based substrates so as to increase the service life of such component parts.

With reference to FIGS. 1a and 1b, prior art environmental barrier coatings form a composite 10 comprising a silicon based substrate 12, a bond coat or layer 14 such as a dense continuous layer of silicon metal, a barrier layer 16 such as either an alkaline earth aluminosilicate based on barium and strontium, or yttrium silicate, and an optional top layer such as a refractory oxide and/or silicate layer 18 or other metal oxide such as for example zirconium oxide. In addition, an intermediate layer 20 may be provided between the 14 bond coat and the barrier 16 and/or between the barrier layer 16 and the top layer 18. The intermediate layer comprises, for example, a mixture of the barrier layer material with an additional oxide such as mullite. These prior art environmental barrier systems have proved for many silicon based substrates to be protective with respect to oxidation of the silicon based substrate and, in addition, are adherent. However, it has now been found that certain mechanical properties of some silicon containing substrates especially those substrates having CTE's less than silicon and those which are brittle, such as silicon nitride, suffer a significant reduction in 4-point bend strength at room temperature.

Naturally, it would be highly desirable to provide environmental barrier coatings for silicon containing substrates such as silicon nitride which do not result in significant loss of mechanical properties.

Accordingly, this is a principal object of the present invention to provide bond coats for silicon based substrates which does not have significant adverse affect with respect to mechanical properties.

SUMMARY OF THE INVENTION

The foregoing object is achieved by the present invention by providing an improved bond layer for use on a silicon based substrate. The bond layer comprises an alloy comprising a refractory metal disilicide/silicon eutectic. The refractory metal disilicide is selected from the group consisting of disilicides of molybdenum, chromium, hafnium, niobium, tantalum, rhenium, titanium, tungsten, uranium, vanadium, yttrium and mixtures thereof. The refractory metal disilicide/silicon eutectic has a melting point of greater than 1300° C.

The particular advantage achieved by the present invention is an increase in room temperature fracture toughness when compared to silicon metal bond layers as discussed above. It has been found that the fracture toughness of the bond coat is increased by more than 50% over that achievable with a simple phase silicon metal bond coat. This increase in fracture toughness is attributable to the mechanism of the two phase microstructure of the present invention which provides more resistance to crack propagation than that observed in a single phase, silicon layer.

Further objects and advantages will appear hereinbelow.

DETAILED DESCRIPTION

Figure 1A:
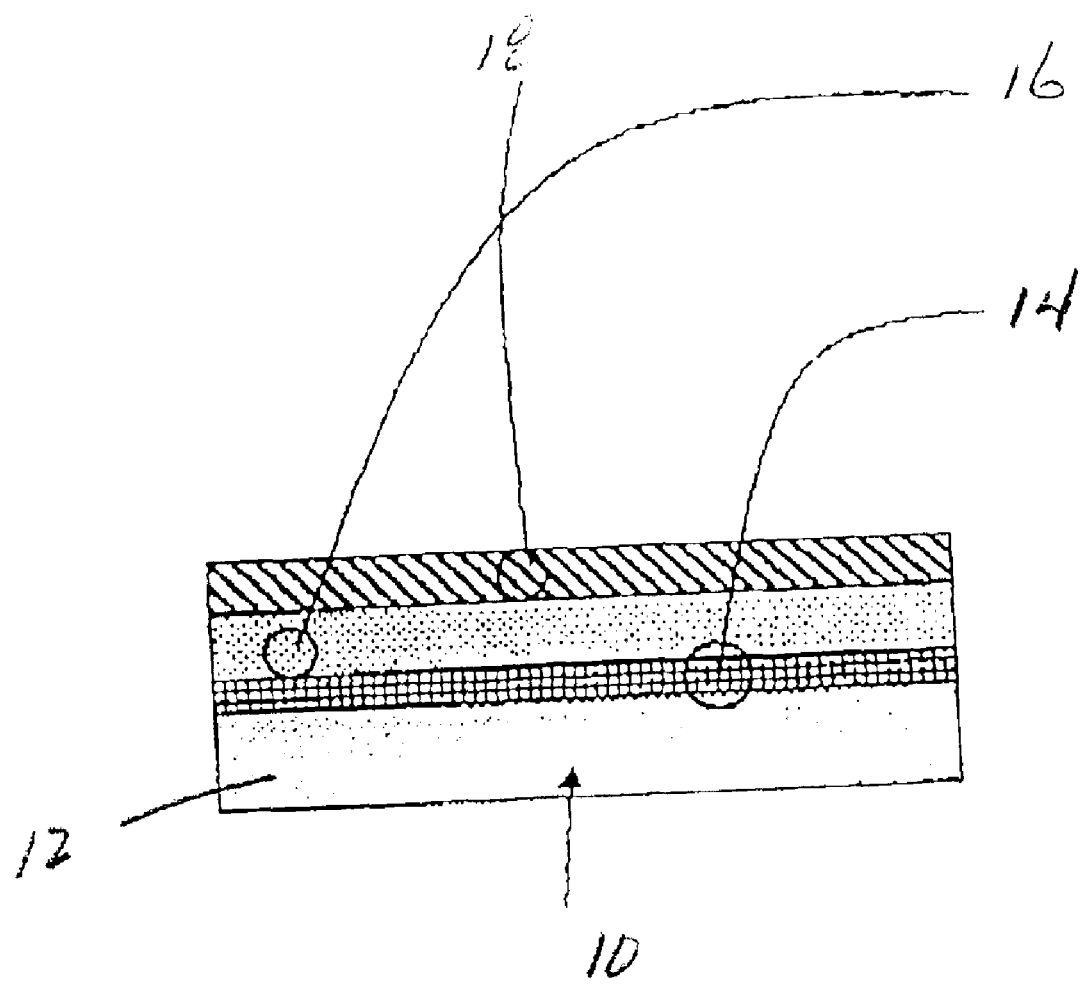
FIGS. 1a and 1b are schematic illustrations of composite articles in accordance with the prior art.
Figure 1B:
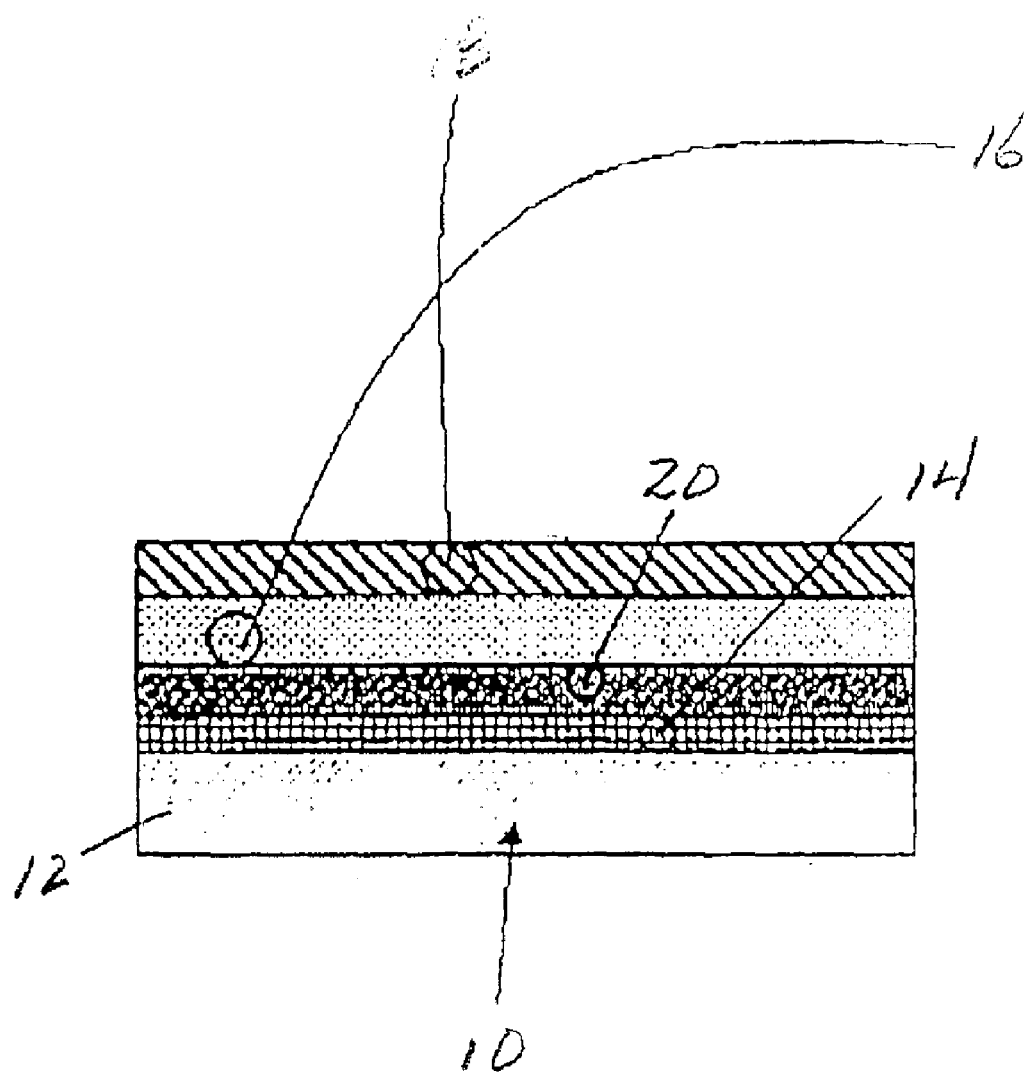

The present invention relates to an article comprising a silicon base substrate and a bond layer. The bond layer may be applied directly on the silicon base substrate or, alternatively, a silicon oxide intermediate layer or other intermediate layer may be provided between the bond layer and the silicon base substrate.

The silicon containing substrate may be a silicon ceramic substrate or a silicon containing metal alloy. In a preferred embodiment, the silicon containing substrate is a silicon containing ceramic material as, for example, silicon carbide, silicon carbide composite, silicon nitride, silicon nitride composite, silicon oxynitride and silicon aluminum oxynitride.

In accordance with the present invention, the bond layer comprises an alloy comprising a refractory metal disilicide/silicon eutectic. The bond layer may comprise 100% of the refractory metal disilicide/silicon eutectic or the bond layer may comprise a multiphase microstructure of the refractory metal disilicide/silicon eutectic alone or with either silicon or the refractory metal disilicide. In either case, the refractory metal disilicide/silicon eutectic has a melting point of greater than 1300° C. The silicon content of the bond layer is greater than or equal to 66.7 atomic percent silicon, preferably 80 atomic percent silicon, with the balance being the refractory metal.

Preferred refractory metals used in the bond layer of the present invention are selected from the group consisting of molybdenum, chromium, hafnium, niobium, tantalum, rhenium, titanium, tungsten, uranium, vanadium, yttrium and mixtures thereof. Preferred refractory metals are molybdenum and chromium and the most preferred refractory metal is molybdenum. The article of the present invention exhibits significant improvement in fracture toughness over silicon metal bond layers known in the prior art, that is, a fracture toughness of greater than 1 MPa·m$^{1/2}$.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An article comprising a silicon based substrate, at least one environmental barrier layer selected from the group consisting essentially of an alkaline earth aluminosilicate based on barium and strontium, and yttrium silicate, and a bond layer between the substrate and the environmental barrier layer, the bond layer comprises an alloy comprising a refractory metal disilicide/silicon eutectic.

2. An article according to claim 1, wherein the refractory metal disilicide is selected from the group consisting of disilicides of molybdenum, chromium, hafnium, niobium, rhenium, tantalum, titanium, tungsten, uranium, vanadium, yttrium and mixtures thereof.

3. An article according to claim 1, wherein the refractory metal disilicide is selected from the group consisting of disilicides of molybdenum, chromium, hafnium, niobium, rhenium, tantalum, titanium, tungsten, uranium, vanadium, yttrium, molybdenum, chromium and mixtures thereof.

4. An article according to claim 1, wherein the refractory metal disilicide/silicon eutectic has a melting point of greater than 1300° C.

5. An article according claim 1, wherein the bond layer comprises a multiphase microstructure of the refractory metal disilicide/silicon eutectic and silicon.

6. An article according to claim 5, wherein the fracture toughness is of greater than 1 MPa·m$^{1/2}$.

7. An article according to claim 1, wherein the bond layer comprises a multiphase microstructure of the refractory metal disilicide/silicon eutectic and refractory metal disilicide.

8. An article according to claim 7, wherein the fracture toughness of greater than 1 MPa·m$^{1/2}$.

9. An article according to claim 1, wherein the bond layer comprises a multiphase microstructure of the refractory metal disilicide/silicon eutectic and one of silicon and refractory metal disilicide.

10. An article according to claim 9, wherein the fracture toughness is of greater than 1 MPa·m$^{1/2}$.

11. An article according to claim 1, wherein silicon is present in an amount of greater than or equal to 66.7 atomic percent.

12. An article according to claim 9, wherein silicon is present in an amount of greater than or equal to 66.7 atomic percent.

13. An article according to claim 1, wherein silicon is present in an amount of greater than or equal to 80 atomic percent.

14. An article according to claim 9, wherein silicon is present in an amount of greater than or equal to 80 atomic percent.

* * * * *

UNITED STATES PATENT AND TRADEMARK OFFICE
CERTIFICATE OF CORRECTION

PATENT NO. : 7,060,360 B2 Page 1 of 1
APPLICATION NO. : 10/443342
DATED : June 13, 2006
INVENTOR(S) : Harry E. Eaton, Jr.

It is certified that error appears in the above-identified patent and that said Letters Patent is hereby corrected as shown below:

Col. 1, Line 4, please add the following paragraph on page 1 before the "Background of The Invention" in the Specification:

--This Invention was made with Government support under Contract Number N00014-01-C-0032 awarded by the Navy. The Government has certain rights in this invention.--

Signed and Sealed this

Twenty-second Day of September, 2009

David J. Kappos
*Director of the United States Patent and Trademark Office*